United States Patent
Cahill et al.

(10) Patent No.: US 8,118,256 B2
(45) Date of Patent: Feb. 21, 2012

(54) BRAKE SHUTOFF VALVE TEST

(75) Inventors: Eric D. Cahill, Troy, OH (US); Thomas E. Clary, Tipp City, OH (US); Paul R. Burte, Clayton, OH (US)

(73) Assignee: Goodrich Corporation, Charlotte, NC (US)

( * ) Notice: Subject to any disclaimer, the term of this patent is extended or adjusted under 35 U.S.C. 154(b) by 652 days.

(21) Appl. No.: 12/249,191

(22) Filed: Oct. 10, 2008

(65) Prior Publication Data

US 2010/0090058 A1 Apr. 15, 2010

(51) Int. Cl.
 *B64C 25/42* (2006.01)
(52) U.S. Cl. ............ 244/111; 244/99.6; 701/71; 60/403; 91/448
(58) Field of Classification Search .................. 244/111, 244/99.6; 701/71; 60/403; 91/448
 See application file for complete search history.

(56) References Cited

U.S. PATENT DOCUMENTS

| | | | |
|---|---|---|---|
| 5,050,940 A * | 9/1991 | Bedford et al. ............... 303/166 |
| 5,962,777 A * | 10/1999 | Salamat et al. ................ 73/121 |
| 6,134,956 A * | 10/2000 | Salamat et al. ................ 73/121 |
| 6,390,571 B1 * | 5/2002 | Murphy ........................ 303/126 |
| 6,513,885 B1 * | 2/2003 | Salamat et al. ........... 303/122.09 |
| 7,128,376 B2 * | 10/2006 | Williams et al. .................... 303/3 |
| 2004/0239173 A1 * | 12/2004 | Williams et al. .................... 303/3 |
| 2006/0113836 A1 * | 6/2006 | Nakamura ............... 303/122.04 |
| 2009/0091180 A1 * | 4/2009 | Iwasaki et al. ................... 303/11 |

FOREIGN PATENT DOCUMENTS

WO 2009/089551 7/2009

OTHER PUBLICATIONS

Patents Act 1977: Search Report under Section 17(5), dated Feb. 22, 2010.

* cited by examiner

*Primary Examiner* — Timothy D Collins
*Assistant Examiner* — Michael A Fabula
(74) *Attorney, Agent, or Firm* — Snell & Wilmer L.L.P.

(57) ABSTRACT

A system, apparatus and method of verifying operation of a vehicle fluid brake system shutoff valve is provided, wherein the shutoff valve is adapted to enable or inhibit the transmission of fluid pressure to at least one brake solenoid valve that controls operation of at least one brake actuator so as to effect wheel braking. In verifying operation of the system, the shutoff valve is commanded to inhibit the transmission of fluid pressure to the at least one brake solenoid valve, and the at least one brake solenoid valve is commanded to apply fluid pressure to the at least one brake actuator. An operational status of the shutoff valve is determined based on the absence or presence of wheel braking.

20 Claims, 3 Drawing Sheets

BRAKE SHUTOFF VALVE TEST

FIELD OF THE INVENTION

The present invention relates generally to brakes and, more particularly, to a method, apparatus, and system for testing a brake safety interlock of an aircraft brake system.

BACKGROUND OF THE INVENTION

Known in the prior art are aircraft wheel and brake assemblies including a non-rotatable wheel support, a wheel mounted to the wheel support for rotation, and a brake disk stack having front and rear axial ends and alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk pack and a brake head is located at the front end. The brake head houses a plurality of actuator rams that extend to compress the brake disk stack against the back plate. Torque is taken out by the stator disks through a static torque tube or the like.

Prior art brake systems typically implement electrically operated actuator rams or hydraulically operated actuator rams, although some brakes may use pneumatically operated actuator rams. In brake systems that employ fluid powered (hydraulic or pneumatic power) actuator rams, the actuator ram is coupled to a power source via a brake servo valve and a safety interlock valve. The safety interlock valve effectively functions as a shutoff valve, wherein in a first position (e.g., an armed position) fluid pressure is permitted to pass through the valve, while in a second position (e.g., a disarmed position) fluid pressure is prevented from passing through the valve. During normal braking, the safety shutoff valve is in the armed position, thereby permitting the flow of fluid pressure. The brake servo valve, based on braking commands from the pilot and/or computer controlled braking, controls the amount of fluid pressure provided to the actuator ram and, thus, the braking force applied to the wheel.

To prevent unintentional braking (e.g., due to a faulty servo valve) during takeoff, the shutoff valve is set in the disarmed position, thereby removing fluid pressure from the servo valve. Since the servo valve does not receive fluid pressure, it cannot provide fluid pressure to the actuator ram and, thus, braking cannot be effected.

SUMMARY OF THE INVENTION

If the shutoff valve fails in the armed position, a dormant failure condition may exist, wherein although there is a fault condition, the system appears to operate normally (the brakes will function as commanded). Should the servo valve also fail in an open position, for example, during aircraft takeoff, the failed shutoff valve will not inhibit the delivery of fluid pressure to the failed servo valve and, thus, the brakes may be inadvertently applied during takeoff.

A system, apparatus and method in accordance with the present invention enable detection of a dormant fault condition of a vehicle's brake shutoff valve. This fault condition then can be reported, and the proper repairs and/or precautions made.

To determine if a dormant fault condition exists with the shutoff valve, a test is performed during a period in which the vehicle is in a fairly benign state (e.g., not taking off, not landing, not traveling at high speeds while on the ground, etc.). During such benign states, the shutoff valve is commanded to the disarmed position (e.g., via hardware circuits), and the servo valve is commanded to apply fluid pressure to the actuator ram. If the shutoff valve and associated hardware circuits are operating correctly, fluid pressure is not available to the servo valve, which in turn cannot apply fluid pressure to the actuator ram and, thus, braking cannot occur. If the shutoff valve has failed such that it is commanded to the disarmed state yet passes fluid pressure to the servo valve, the servo valve provides such pressure to the actuator ram, thereby applying the brakes. This application of the brakes can be detected, for example, by measuring the fluid pressure provided to the actuator ram, the force applied by the actuator ram, and/or deceleration of the wheel (as detected from wheel speed sensors). Further, the failure can be reported to the flight and/or ground crew.

According to one aspect of the invention, a brake system, device and method are provided that can verify operation of a fluid shutoff valve that forms part of a vehicle's brake system. The shutoff valve is adapted to enable or inhibit the transmission of fluid pressure to at least one brake control valve that controls operation of at least one brake actuator so as to effect wheel braking. In performing the verification, the shutoff valve is commanded (e.g., via hardware circuits) to inhibit the transmission of fluid pressure to the at least one brake control valve, and the at least one brake control valve is commanded to apply fluid pressure to the at least one brake actuator. The operational status of the shutoff valve is determined based on the absence or presence of braking.

In a preferred embodiment, the shutoff valve and at least one control valve are commanded to the above-referenced states while the vehicle is in a benign state. For an aircraft, such benign state includes a predetermined time period after the aircraft has become airborne or a predetermined time period prior to landing. If wheel braking is detected during the test, then the shutoff valve is determined to be malfunctional.

The brake system can include a pressure sensor communicatively coupled to the controller and operatively coupled to the actuator, wherein the pressure sensor is operative to measure fluid pressure provided to the at least one actuator. If the fluid pressure is above a predetermined threshold, it can be concluded that braking is active.

Alternatively or in combination with the pressure sensor, each wheel may include a wheel speed sensor communicatively coupled to the controller and operatively coupled to the respective wheel, wherein the wheel speed sensor is operative to measure a velocity of the wheel. If the measured wheel velocity is decelerating at or greater than a predetermined deceleration rate, then it can be concluded that braking is active.

According to another aspect of the invention, there is provided a brake system for applying a braking force to a rotatable wheel of an aircraft. The brake system includes a brake-disk stack, at least one brake actuator for applying and releasing a force on the brake-disk stack so as to effect a braking force on the wheel, and a shutoff valve having an input port for receiving fluid pressure and an output port for outputting fluid pressure. The shutoff valve is configured to selectively enable or inhibit the transmission of fluid pressure from the input port to the output port. At least one control valve is operatively coupled to the shutoff valve output port and to the at least one brake actuator, the at least one control valve configured to control a supply of fluid pressure from the shutoff valve to the at least one brake actuator. A pressure sensor is operatively coupled to the shutoff valve output port and measures fluid pressure at the shutoff valve output port. A controller is operatively coupled to the at least one control valve and the pressure sensor, wherein the controller is configured to a) determine if the shutoff valve should be in an enabled or inhibited state, b) monitor the pressure at the shutoff valve output port, and c) if the shutoff valve should be in the inhibited state, determine an operational status of the shutoff valve based on the absence or presence of fluid pressure at the shutoff valve output port.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

BRIEF DESCRIPTION OF THE DRAWINGS

The forgoing and other embodiments of the invention are hereinafter discussed with reference to the drawings.

DETAILED DESCRIPTION

The principles of the invention will now be described with reference to the drawings. Because the invention was conceived and developed for use in an aircraft braking system, it will be herein described chiefly in this context. However, the principles of the invention in their broader aspects can be adapted to other types of systems and/or vehicles. Moreover, the following discussion of an exemplary computer controlled brake actuation system is given for the sake of illustration and not by way of limitation, except as defined in the claims included at the end of this specification. Accordingly, only general operational details and features of such system will be described so as not to obscure the teachings of the present invention with details that may vary from one particular application to another.

Figure 1:
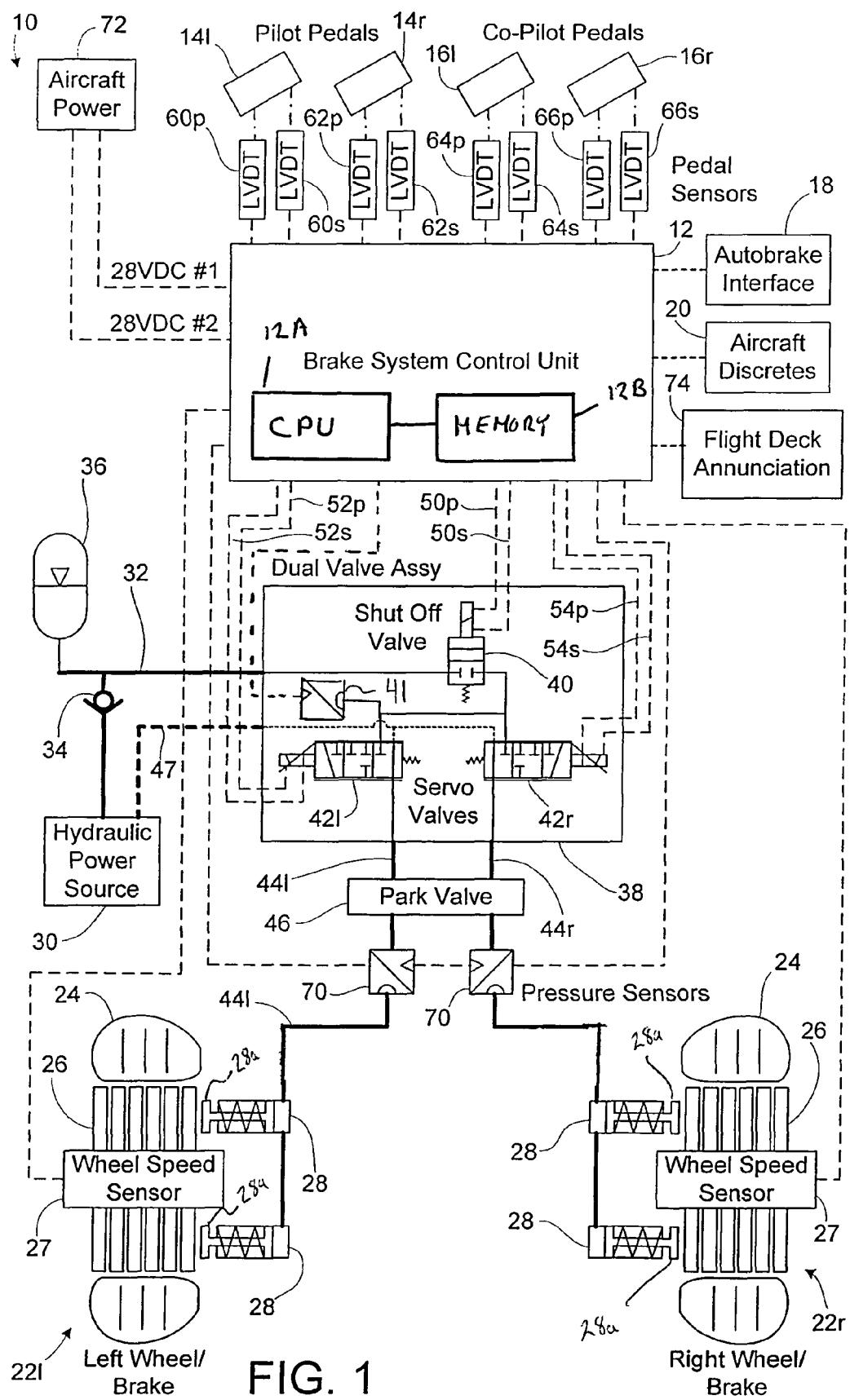
FIG. 1 is a schematic diagram illustrating an exemplary brake system and brake system controller configured to implement a shutoff valve test in accordance with the invention.

Referring to FIG. 1, an exemplary braking system 10 is shown. The braking system 10 includes a braking system control unit (BSCU) 12, which includes a processor 12a and memory 12b (e.g., volatile and/or non-volatile memory). The memory 12b may store logic, such as program code or the like, that is executable by the processor so as to carry out conventional brake control operations as well as testing operation of a brake shutoff valve (e.g., to test for a dormant fault condition). Although a micro-processor is utilized in the illustrated preferred embodiment, processing could be done analog as opposed to digital, or intermixed with digital processing as may be desired. Further details with respect to determination of a possible dormant fault condition are described below with respect to FIG. 2.

The BSCU 12 receives brake command signals from left and right pilot brake pedals 14l and 14r, respectively, and left and right co-pilot brake pedals 16l and 16r, respectively. More specifically, the BSCU 12 utilizes the outputs from the LVDT transducers 60p, 60s, 62p, 62s, 64p, 64s, 66p and 66s coupled to the respective pedals to measure the degree to which each brake pedal 14l, 14r, 16l and 16r is being depressed. The brake command signals from the pilot and co-pilot brake pedals are indicative of a desired amount of braking as is conventional. In addition, the BSCU 12 receives control signals from an autobrake interface 18 for performing conventional autobrake and rejected take-off (RTO) braking functions. The BSCU 12 also receives a series of discrete control signals associated with the aircraft, generally represented as 20, for providing conventional braking control.

In the exemplary embodiment, the BSCU 12 controls braking of a left wheel/brake assembly 22l and a right wheel/brake assembly 22r. The left wheel/brake assembly 22l includes a wheel 24 and brake stack 26. A plurality of actuators 28 (also referred to as motive devices) are provided for exerting a brake force on the brake stack 26 via a reciprocating ram 28a so as to brake the wheel 24. The right wheel/brake assembly 22r has a similar configuration. Each wheel/brake assembly includes a wheel speed sensor 27 which provides wheel speed information to the BSCU 12 for carrying out brake control operations. It will be appreciated that while the present invention is described herein only with respect to two wheels, the principles of the present invention have application to any number of wheels.

A fluid power source 30, such as, for example, a hydraulic power source, serves as the main brake power supply within the system 10. A main hydraulic line 32 from the power source 30 includes a check valve 34 and accumulator 36 as is conventional. The hydraulic line 32 is input into a dual valve assembly 38 included within the system 10. The dual valve assembly 38 includes a shutoff valve 40 through which the main hydraulic line 32 supplies hydraulic fluid to the left and right wheel servo valves 42l and 42r, respectively. Pressure supplied by the shutoff valve 40 to the servo valves 42l and 42r may be measured by pressure sensor 41 and provided to the BSCU 12. Fluid from the left and right wheel servo valves 42l and 42r is provided through left and right hydraulic lines 44l and 44r, respectively, to a park valve 46 which holds the applied braking force to the wheels during a parking brake operation as is conventional. A return line 47 is provided from the servo valves 42l and 42r back to the hydraulic power source 30. During normal operation, fluid pressure through the left and right hydraulic lines 44l and 44r passes through the park valve 46 and to the corresponding actuators 28. Thus, provided the system 10 is functioning properly, the shutoff valve 40 is open during braking and the BSCU 12 controls the amount of hydraulic pressure that is delivered to each wheel 24 via the corresponding servo valve 42l and 42r.

The BSCU 12 includes a primary control channel and a secondary control channel. The shutoff valve 40 receives a shutoff valve control signal on line 50p from the primary channel and a shutoff valve control signal on line 50s from the secondary channel. Similarly, the left wheel servo valve 42l receives a servo valve control signal on line 52p from the primary channel and a servo valve control signal on line 52s from the secondary channel. Likewise, the right wheel servo valve 42r receives a servo valve control signal on line 54p from the primary channel and a servo valve control signal on line 54s from the secondary channel. Because the valves are each dual control coil valves, each valve can be controlled by both the primary and secondary channels of the BSCU 12. Such redundancy, as is explained more fully below, allows full brake operation to continue even in the event one of the channels should fail.

As is shown in FIG. 1, the braking system 10 includes pressure sensors 70 for monitoring the hydraulic pressure in lines 44l and 44r and providing such information back to the BSCU 12. In addition, power to the BSCU 12 preferably is provided via two separate and independent power buses designated 72.

The braking system 10 further includes a cockpit display 74 coupled to the BSCU 12. The display 74 communicates to the pilot and co-pilot information relating to the braking operations as is conventional, and further alerts the pilot and co-pilot of the shutoff valve test results as discussed below.

The hydraulic portion of the system 10 utilizes the shutoff valve 40 in line with the servo valves 42*l* and 42*r* to provide a level of redundancy that ensures a single valve failure cannot cause inadvertent braking. In order for braking force to be applied by the system 10, the shutoff valve 40 must be open (armed) along with at least one of the two servo valves 42*l* and 42*r*.

Figure 2:
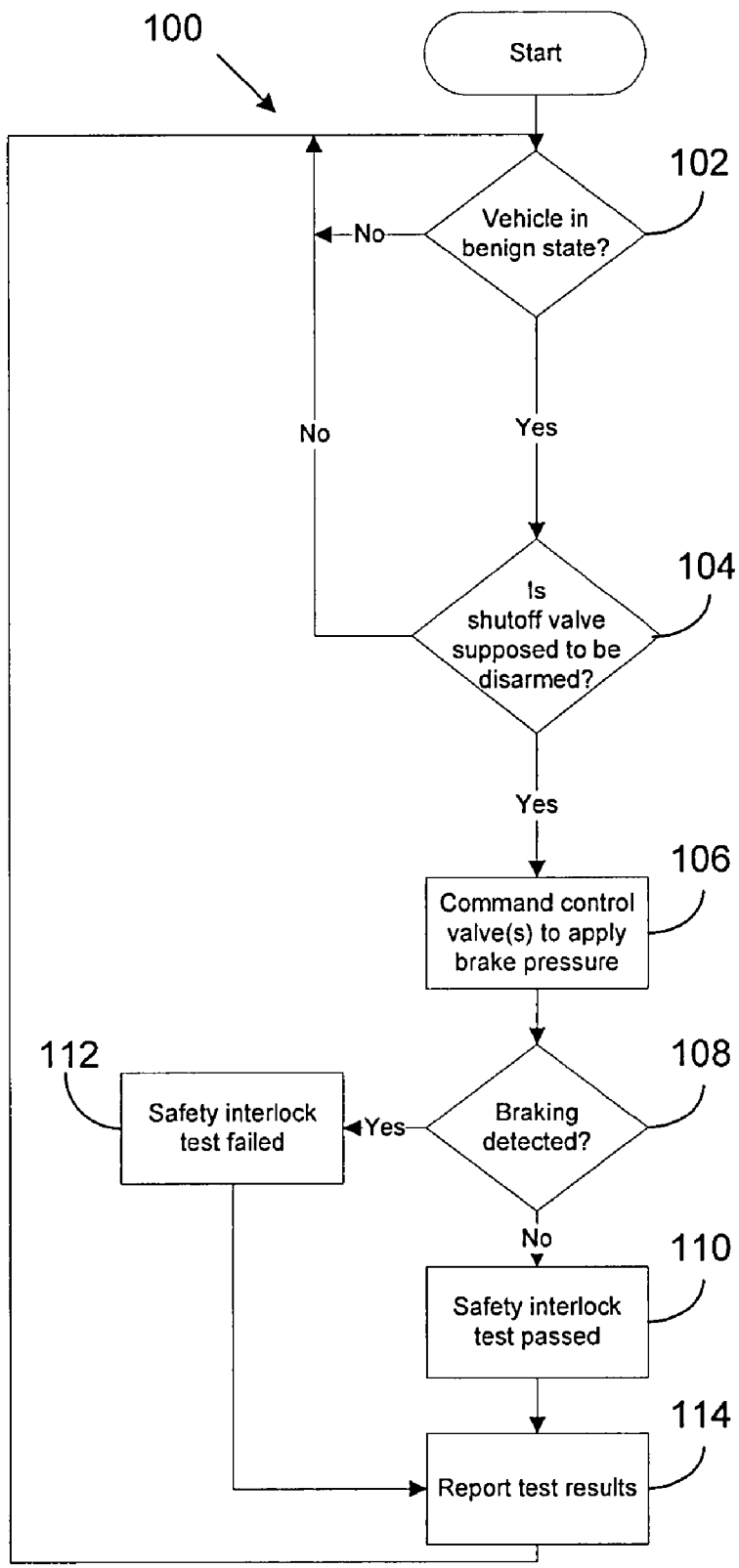
FIG. 2 is a flowchart illustrating an exemplary shutoff valve test in accordance with the invention.

As discussed herein, if the shutoff valve 40 fails in an on (armed) position, the system still may appear to operate normally. Such a fault condition may go unnoticed until the brakes are inadvertently applied, which is undesirable. The BSCU 12 is suitably programmed to carry out a shutoff valve test routine in accordance with the invention. FIG. 2 illustrates a preferred embodiment of the shutoff valve test routine 100.

Beginning at block 102 of FIG. 2, it is determined if the vehicle is in a benign state (i.e., a state in which the test can be carried out without adversely affecting operation of the vehicle). As will be appreciated, such state is dependent on the type of vehicle in which the test is being performed. For an aircraft, a benign state may be a predetermined time after the aircraft has become airborne and/or a predetermined time prior to landing. In addition, the benign state may be further conditioned upon the absence of a braking command from the pilot.

For example, after takeoff the landing gear are typically retracted, and during landing the landing gear are typically deployed. The command to retract and/or deploy the landing gear, in combination with the absence of a pilot braking command, may be equated as the aircraft being in a benign state. Such retract/deploy commands may originate within the BSCU 12 and, thus, are readily available to determine the state of the aircraft. As will be appreciated, other signals, including signals internal to the BSCU as well as signals external from the BSCU 12, may be utilized to determine the state of the vehicle. For example, the wheel speed sensors 27 may provide data to the BSCU 12 indicative of wheel speed. The wheel speed data, in conjunction with the absence or presence of a pilot braking command, then can be used to determine if the vehicle is in a benign state (e.g., a wheel velocity below a predetermined velocity along with the absence of a pilot braking command may be considered a benign state).

If the vehicle is not in a benign state, then the shutoff valve test is not performed and the method loops at block 102. If the vehicle is in a benign state, then the method moves to block 104 where it is determined if the shutoff valve 40 is supposed to be closed (disarmed such that the delivery of fluid power from the shutoff valve to the solenoid valves 42*l* and 42*r* is interrupted). For example, the shutoff valve 40 is typically controlled by hardware circuits, and not directly by the BSCU 12. The BSCU 12 simply may know that the valve 40 should be open or closed, without directly issuing an open or close (armed or disarmed) command. As will be appreciated, it is possible to directly control the shutoff valve 40 via the BSCU 12, although this is not a preferred operation of the brake system.

If it is determined that the shutoff valve is not supposed to be disarmed, then the method moves back to block 102. However, if the shutoff valve 40 is supposed to be disarmed, then at block 106 the solenoid valves 42*l* and 42*r* are commanded to apply fluid pressure to the actuators 28. More specifically, the BSCU 12 provides signals to the solenoid valves 42*l* and 42*r* to at least partially, and preferably fully, open the valves. Such signals may be by way of analog signals (e.g., 0-5 V, 4-20 mA, etc.) provided by the BSCU 12 and electrically coupled to the respective solenoid valves 42*l* and 42*r*, or by way of high speed serial communications between the BSCU 12 and the solenoid valves 42*l* and 42*r*. The solenoid valves 42*l* and 42*r* then respond to the commands from the BSCU 12 and proceed to open, thereby allowing any fluid pressure provided by the shutoff valve 40 to be applied to the actuators 28. If the shutoff valve 40 is operating properly, then fluid pressure is not provided to the solenoid valves 42*l* an 42*r* and, therefore, even though the solenoid valves are opened, fluid pressure is not provided to the actuators 28 and braking does not occur. However, if the shutoff valve 40 is malfunctioning, it will allow fluid pressure to pass to the solenoid valves 42*l* and 42*r*. As the solenoid valves 42*l* and 42*r* are commanded to open, fluid pressure is provided to the actuators 28 and, as a result of the fluid pressure, the actuators 28 will apply a force to the brake-disk stack 26.

At block 108 it is determined if braking is occurring. Braking may be determined, for example, based on fluid pressure supplied to the actuators 28. Such pressure can be measured, for example, by the pressure sensors 70 and communicated to the BSCU 12. If the pressure provided to the actuators 28 exceeds a predetermined threshold, then it can be concluded that brake application is occurring. Conversely, if the measured pressure does not exceed the predetermined threshold, then it can be concluded that brake application is not occurring. Other means in which brake application may be detected include determining a deceleration rate of the wheels 24. Such deceleration rate may be calculated by the BSCU 12 based on data provided by the wheels speed sensors 27. If the deceleration rate is greater than a predetermined threshold, then it can be concluded that brake application is occurring, and if it not greater that the predetermined threshold, then it can be concluded that brake application is not occurring. Yet another means by which brake application may be determined is by measurement of the force applied by the actuators 28 to the brake disk stack 26. Such force may be measured by way of force transducers (not shown), for example, operatively coupled to the actuators 28. Further, braking may be detected by deflection of the brake pedal (e.g., a brake command issued by the pilot), and by displacement of the actuator.

If braking is not detected, then the shutoff valve 40 has passed the test as indicated at block 110. However, if braking is detected, then the shutoff valve 40 has failed the test as indicated at block 112. The results of the test then can be reported as indicated at block 114, for example on the flight deck annunciation panel 74. The output may be by way of a visual and/or audio alert. Further, if the shutoff valve 40 failed the test, operation of the vehicle may be limited (e.g., very slow speed operation may be permitted) or even inhibited.

In another embodiment, the BSCU 12 may determine the functionality of the shutoff valve 40 based on data provided by the pressure sensor 41. For example, instead of detecting braking at step 108, the BSCU 12 simply may monitor the hydraulic pressure output by the shutoff valve 40 as measured by the sensor 41. If pressure is detected and the shutoff valve should be in the inhibited (disarmed) state, then it can be concluded that the shutoff valve 40 has failed the test, and if pressure not detected and the shutoff valve should be in the inhibited state, then it can be concluded that the valve 40 has passed the test.

Figure 3A:
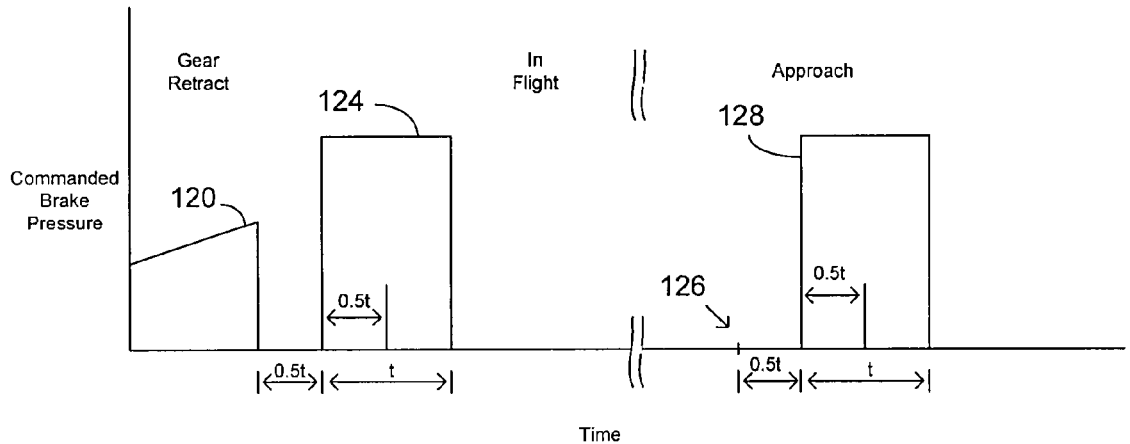
FIGS. 3A-3C are graphs illustrating exemplary commanded and actual brake pressure signals during operation of the shutoff valve test in accordance with the invention.
Figure 3B:
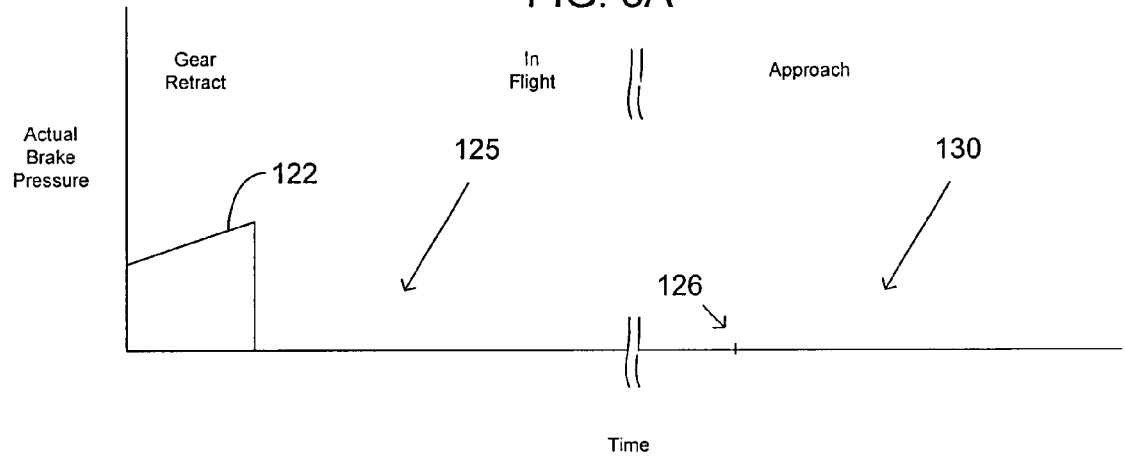
Figure 3C:
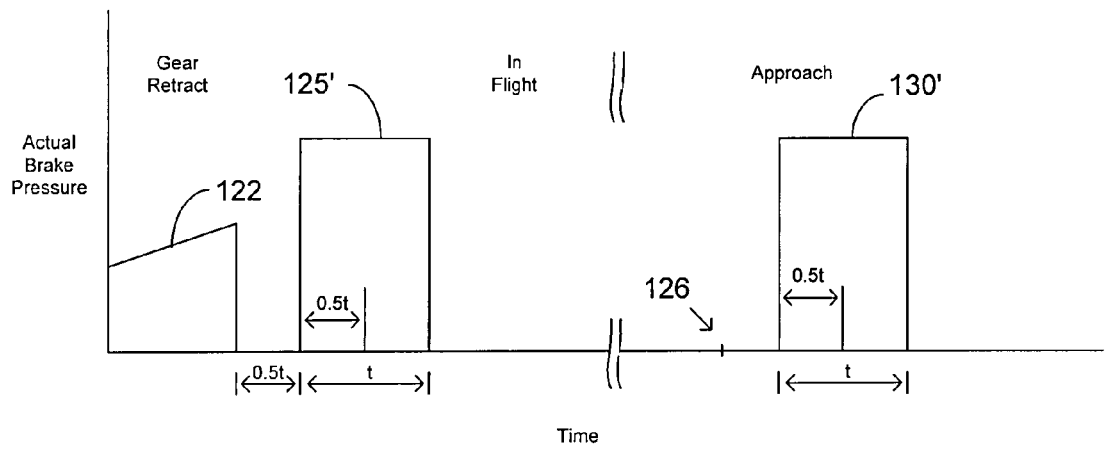

Moving now to FIGS. 3A-3C, there are shown exemplary pressure graphs that illustrate operation of the shutoff valve test routine. FIG. 3A illustrates the commanded brake pressure, FIG. 3B illustrates the actual brake pressure during normal operation of the shutoff valve 40, and FIG. 3C illustrates actual brake pressure during complete failure of the shutoff valve 40.

At the beginning of the exemplary graphs of FIGS. 3A-3C, the shutoff valve 40 is assumed to be in the armed position (i.e., fluid pressure is permitted to pass through the shutoff valve). As the aircraft becomes airborne, a gear retract command is issued to bring the landing gear within the aircraft fuselage. During the gear retract routine, a retract brake command 120 is issued to bring the wheels 24 to a stop before or shortly after each landing gear has been retracted. In response to the retract brake command 120, the servo valves 42*l* and 42*r* open in proportion to the command 120, and the actual brake pressure 122 increases as shown in FIG. 3B and 3C so as to corresponding with the commanded brake pressure 120.

A predetermined time after the gear retract routine has been completed and brake pressure has been removed, the shutoff valve 40 is commanded to the disarmed state (i.e., fluid pressure is inhibited from passing through the shutoff valve), and a full brake pressure command 124 is issued. In response to the full brake pressure command 124, the servo valves 42*l* and 42*r* completely open. If the shutoff valve 40 is functioning normally, fluid pressure will not be provided to solenoid valves 42*l* and 42*r* and, thus actual brake pressure 125 will not follow the commanded brake pressure, as indicated in FIG. 3B. If the shutoff valve does not inhibit the passage of fluid pressure, then the actual brake pressure 125' will rise as indicated in FIG. 3C. The pressure that will actually be applied to the actuators 28 is dependent on the failure level of the shutoff valve 40 (e.g., complete vs. partial failure). The status of the valve 40 then can be determined based on the absence or presence of braking as discussed herein.

The test also may be executed prior to landing. More specifically, as the aircraft makes its initial approach for landing, the pilot may command the landing gear to deploy, as indicated by the marker 126. A predetermined time after the landing gear deploy command has been issued, the shutoff valve 40 is commanded to the disarm position (if not already in that position) and a full brake pressure command 128 is issued. In response to the full brake pressure command 128, the servo valves 42*l* and 42*r* again completely open. If the shutoff valve 40 is functioning normally, fluid pressure will not be provided to solenoid valves 42*l* and 42*r* and actual brake pressure 130 will not follow the commanded brake pressure, as indicated in FIG. 3B. If the shutoff valve does not inhibit the passage of fluid pressure, then the actual brake pressure 130' will rise as indicated in FIG. 3C.

Accordingly, a brake controller, system, and method is provided that can determine if a dormant fault condition exists with the fluid shutoff valve 40. Should a fault condition exist, a warning can be issued and the appropriate action can be taken.

A person having ordinary skill in the art of computer programming and applications of programming for computer systems would be able in view of the description provided herein to program the BSCU 12 to operate and to carry out the functions described herein. Accordingly, details as to the specific programming code have been omitted for the sake of brevity. Also, while software in the memory 12*b* or in some other memory of the BSCU 12 may be used to allow the system to carry out the functions and features described herein in accordance with the preferred embodiment of the invention, such functions and features also could be carried out via dedicated hardware, firmware, software, or combinations thereof, without departing from the scope of the invention.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

In addition, the invention is considered to reside in all workable combinations of features herein disclosed, whether initially claimed in combination or not and whether or not disclosed in the same embodiment.

What is claimed is:

1. A brake system for applying a braking force to a rotatable wheel of an aircraft, comprising:
    a brake-disk stack;
    at least one brake actuator for applying and releasing a force on the brake-disk stack so as to effect a braking force on the wheel;
    a shutoff valve having an input port for receiving fluid pressure and an output port for outputting fluid pressure, the shutoff valve configured to selectively enable or inhibit the transmission of fluid pressure from the input port to the output port;
    at least one control valve operatively coupled to the shutoff valve output port and the at least one brake actuator, the at least one control valve configured to control a supply of fluid pressure from the shutoff valve to the at least one brake actuator; and a controller operatively coupled to the at least one control valve, the controller configured to determine whether the shutoff valve should be in an inhibited state, command, in response to a determination that the shutoff valve should be in the inhibited state, the at least one control valve to apply fluid pressure to the at least one actuator, and determine an operational status of the shutoff valve based on the absence or presence of wheel braking.

2. The brake system according to claim 1, wherein the controller is further configured to command the control valve while the aircraft is in a benign state.

3. The brake system according to claim 2, wherein the benign state includes a predetermined time period after the aircraft has become airborne or a predetermined time period prior to the aircraft landing.

4. The brake system according to claim 1, wherein the controller is configured to command the control valve to apply full fluid pressure to the at least one actuator.

5. The brake system according to claim 1, wherein the controller is configured to conclude that the shutoff valve is malfunctioning in response to detection of wheel braking.

6. The brake system according to claim 5, further comprising a pressure sensor communicatively coupled to the controller and operatively coupled to the brake actuator, the pressure sensor operative to measure fluid pressure provided to the at least one brake actuator, wherein the controller is further configured to: receive from the pressure sensor data indicative of fluid pressure at the at least one brake actuator; and conclude the shutoff valve is malfunctional in response to the fluid pressure exceeding a predetermined threshold.

7. The brake system according to claim 5, further comprising a wheel speed sensor communicatively coupled to the controller and operatively coupled to the wheel, the wheel speed sensor operative to measure a velocity of the wheel, wherein the controller is configured to: receive from the wheel speed sensor data indicative of wheel velocity of the wheel corresponding to the at least one brake actuator; and conclude the shutoff valve is malfunctional in response to the wheel velocity decreasing by at least a predetermined rate.

8. The brake system according to claim 1, wherein the controller is configured to conclude wheel braking is absent in response to fluid pressure at the shutoff valve output port decreasing below a predetermined threshold, and wheel braking is present in response to fluid pressure at the shutoff valve output port exceeding a predetermined threshold.

9. A method of verifying operation of an aircraft fluid brake system shutoff valve, said shutoff valve operable to enable or inhibit the transmission of fluid pressure to at least one brake control valve that controls operation of at least one brake actuator so as to effect wheel braking, comprising:

determining whether the shutoff valve should be in a state that inhibits the transmission of fluid pressure to the at least one control valve;

commanding, by a brake controller, in response to a determination that the shutoff valve should be in the inhibited state, the at least one control valve to apply fluid pressure to the at least one brake actuator; and determining an operational status of the shutoff valve based on the absence or presence of wheel braking.

10. The method according to claim 9, wherein commanding the at least one control valve includes issuing the command while the aircraft is in a benign state.

11. The method according to claim 10, wherein issuing the command while the aircraft is in a benign state includes issuing the command after the aircraft has become airborne or prior to the aircraft landing.

12. The method according to claim 9, wherein determining the operational status of the shutoff valve includes concluding that the shutoff valve is malfunctioning in response to detection of wheel braking.

13. The method according to claim 12, wherein determining wheel braking includes: monitoring fluid pressure at the at least one brake actuator; and concluding braking is active in response to the fluid pressure exceeding a predetermined threshold.

14. The method according to claim 9, wherein determining wheel braking includes: monitoring a velocity of the wheel corresponding to the at least one brake actuator; and concluding braking is active in response to the velocity decreasing by at least a predetermined rate.

15. A brake controller for verifying operation of an aircraft fluid brake system shutoff valve, said shutoff valve adapted to enable or inhibit the transmission of fluid pressure to at least one brake control valve that controls operation of at least one brake actuator so as to effect wheel braking, said brake controller comprising:

a processor and non-transitory, tangible, memory, the tangible, non-transitory memory having instructions stored thereon that, in response to execution by the processor, cause the processor to perform operations comprising:

determining whether the shutoff valve should be in a state that inhibits the transmission of fluid pressure to the at least one brake control valve;

commanding, in response to a determination that the shutoff valve should be in the inhibited state, the at least one brake control valve to apply fluid pressure to the at least one brake actuator; and an operational status of the shutoff valve based on the absence or presence of wheel braking.

16. The brake controller according to claim 15, further comprising issuing the command while the aircraft is in a benign state.

17. The brake controller according to claim 16, wherein the issuing occurs after the aircraft has become airborne or prior to the aircraft landing.

18. The brake controller according to claim 15, further comprising concluding that the shutoff valve is malfunctioning if wheel braking is detected.

19. The brake controller according to claim 18, further comprising monitoring fluid pressure at the at least one brake actuator; and concluding that braking is active in response to the fluid pressure exceeding a predetermined threshold.

20. The brake controller according to claim 18, further comprising monitoring a velocity of the wheel corresponding to the at least one brake actuator; and concluding that braking is active in response to the velocity decreasing by at least a predetermined rate.

* * * * *